United States Patent [19]
Thompson et al.

[11] 3,990,668
[45] Nov. 9, 1976

[54] HYDRAULIC SUSPENSION SEAT ASSEMBLY

[75] Inventors: James Edward Thompson, Cedar Falls; Robert Dean Dixon, Waterloo, both of Iowa

[73] Assignee: Deere & Company, Moline, Ill.

[22] Filed: Jan. 15, 1976

[21] Appl. No.: 649,488

[52] U.S. Cl. .............................................. 248/400
[51] Int. Cl.² ........................................ A45D 19/04
[58] Field of Search ............... 248/399, 400, 404; 267/117, 120, 131; 91/62; 297/345

[56]     References Cited
           UNITED STATES PATENTS

| | | |
|---|---|---|
| 3,036,844 | 5/1962 | Vogel .................................. 248/400 |
| 3,201,079 | 8/1965 | Doetsch ............................... 248/400 |
| 3,558,094 | 1/1971 | Radke et al. ......................... 248/400 |
| 3,638,897 | 2/1972 | Harder et al. ........................ 248/400 |
| 3,865,341 | 2/1975 | Fortnam et al. ...................... 248/404 |
| 3,938,770 | 2/1976 | Turner et al. ........................ 248/400 |

*Primary Examiner* — Robert A. Hafer

[57]            ABSTRACT

A vehicle seat assembly includes an actuator controlled by a three-position spool valve which is connected by an adjustable two-link linkage to the seat. The valve is directly responsive to the geometry of the linkage to urge the seat, regardless of the load on the seat, to a ride position established by the linkage.

16 Claims, 2 Drawing Figures

HYDRAULIC SUSPENSION SEAT ASSEMBLY

BACKGROUND OF THE INVENTION

The present invention relates generally to adjustable-ride-position maintaining seat assemblies and more particularly to a simple seat assembly having a valve connected by a two-link linkage to the seat.

In the past, it was recognized that it would be desirable to have a vehicle seat which would absorb shocks and maintain a predetermined ride position across rough terrain regardless of the weight of the operator while featuring adjustment of the predetermined ride position to accommodate different size operators.

One of the first seats able to maintain an adjustable ride position is shown in the U.S. Pat. No. 3,210,019 granted to Elfes et al. on 16 Nov. 1965. The seat was made adjustable by having adjustment means for moving a platform relative to a base and placing a ride position maintaining device on the platform. The Elfes et al system was relatively complex in requiring separate means for adjustment and for maintaining the predetermined ride position.

Subsequently, a seat was developed such as that shown in the U.S. Pat. No. 3,638,897 granted to Harder, Jr., et al. on 1 Feb. 1972. The seat assembly moves substantially vetically by swinging on generally horizontal parallel linkages. To establish and adjust the ride position, a relatively complex three-link linkage is required to activate a valve which controls an actuator for raising and lowering the seat. To provide for large adjustments and to maintain the predetermined ride position, a specially fabricated flexible link is required between the seat and the valve.

SUMMARY OF THE INVENTION

The present invention provides for an adjustable-ride-position maintaining seat assembly which eliminates the drawbacks of past assemblies.

The assembly utilizes a hydraulic actuator activated by a valve whose spool is directly connected by a simple two-link linkage to the seat. Means are provided in the valve to change the response of an accumulator which is operatively connected to the actuator to cushion the ride and further means are provided in the valve to prevent change of the predetermined ride position adjustment when the fluid source is shut down.

The above and additional advantages of the present invention will become apparent to those skilled in the art from a consideration of the following detailed description of the preferred embodiment when taken in conjunction with the accompanying drawings.

DESCRIPTION OF THE PREFERRED EMBODIMENT

Figure 1:
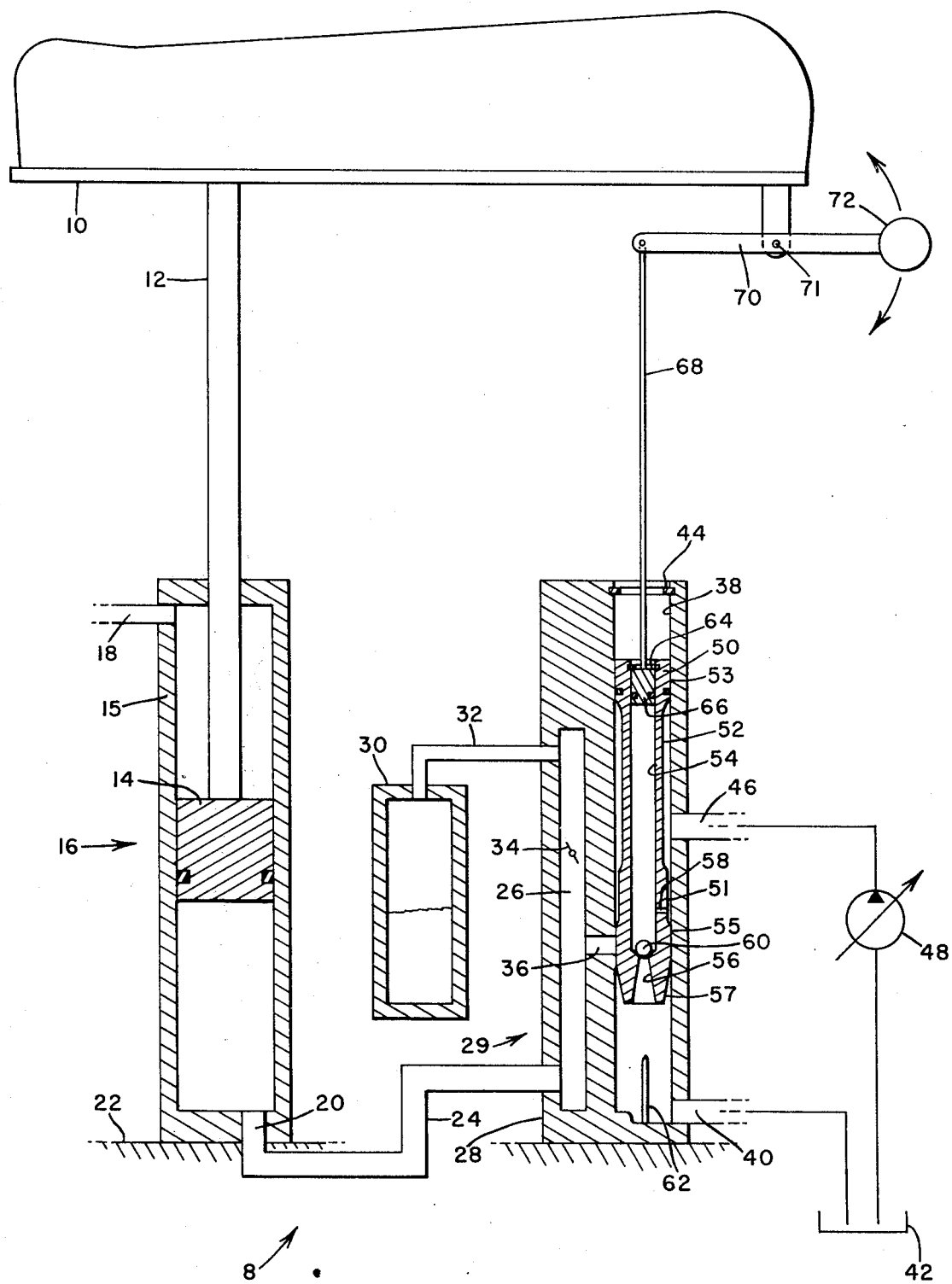
FIG. 1 is a sectional elevation of the seat assembly incorporating the present invention in an operating position.

Referring to FIG. 1, therein is shown a seat assembly 8 having a seat 10 upon which an operator would be seated. Supporting the seat 10 is a rod 12 which is connected to a piston 14 which is slidably received within the body 15 of a single acting hydraulic cylinder 16. The cylinder body 15 has a relief port 18 in the rod end and a main port 20 in the piston end. The piston end of the cylinder 16 is secured to a structure generally designated by the number 22 which may be a part of a vehicle containing the seat assembly 8. The main port 20 is connected by a fluid passage 24 to an actuator chamber 26 in a valve body 28 of a height adjusting and maintaining assembly 29. The actutator chamber 26 is connected to an accumulator 30 by a fluid passage 32. Disposed in the actuator chamber 26 between the fluid passages 24 and 32 is conventional variable restrictor or accumulator dampening adjustment valve 34. Between the fluid passage 24 and the adjustment valve 34 is an actuator passage 36 which connects with a vertical bore 38 in the valve body 28.

The vertical bore 38 is open at the top end and connected to a reservoir passage 40 at the bottom end. The reservoir passage 40 is connected to a reservoir 42. Proximate the top end of the bore 38 is a retaining ring 44 and between the retaining ring 44 and the reservoir passage 40 is a source passage 46 which is supplied with pressurized fluid from a source or pump 48 which is fed from the reservoir 42.

Slidaly received within the bore 38 is a valve spool 50 which is limited in its upward travel by the retaining ring 44. The valve spool 50 contains an annular groove 52 located between top and bottom valve lands 53 and 55. Adjacent to and above the bottom valve land 55 is a metering land 51 of lesser diameter than the land 55 and adjacent to and below the land 55 is a metering land 57 which tapers toward the bottom. The valve spool 50 is provided with a longitudinal hole 54 therein open at the top and having an opening 56 therein fluidly connected to the bottom of the bore 38. Close to the opening 56 in the wall of the longitudinal hole 54 is a passage 58 which connects the longitudinal hole 54 to the surface of the metering 1 and 51 and thence to the annular groove 52. A ball 60 rests in the longitudinal hole 54 and blocks off the opening 56. The ball 60 is moveable to unblock the opening 56 by a pin 62 in the bottom of the bore 38 which protrudes through the opening 56 when the spool 50 bottoms in the bore 38.

A valve piston 66 is slidably positioned in the longitudinal hole 54 and is limited in its upward movement by a retaining ring 64 in the spool 50. The valve piston 66 is connected to the seat 10 by a rigid rod 68 which is pivotally secured to a rigid adjusting lever or link 70 which in turn is secured by a friction holding pivot 71. The adjusting link 70 has a manual adjustment knob 72 at the end opposite the rod 68 which is movable in the directions shown by the arrows in FIGS. 1 and 2.

Figure 2:
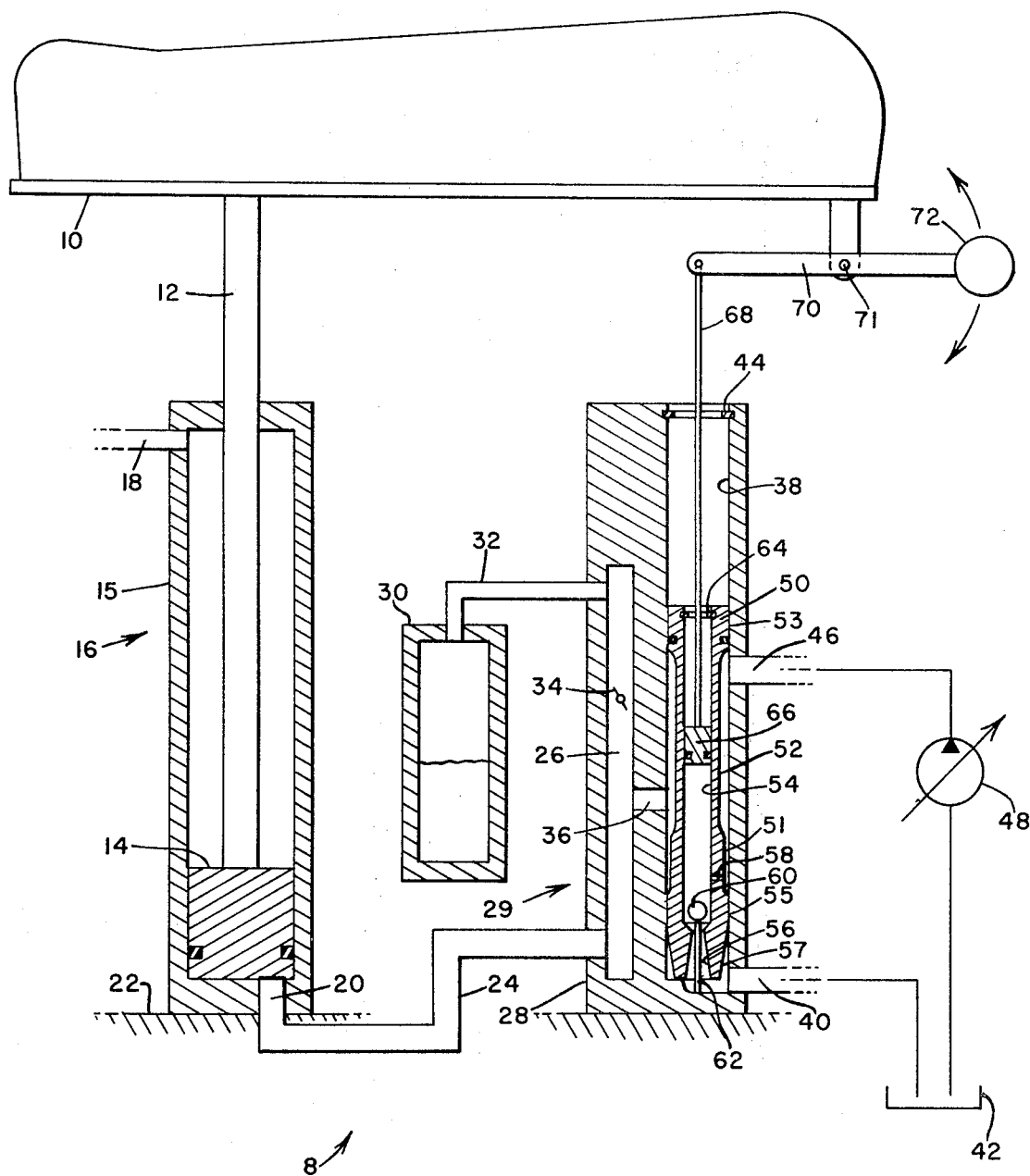
FIG. 2 is a sectional elevation of the seat assembly incorporating the present invention in an inactive position.

When the pump 48 is shut off, the seat assembly 8 will be in the position shown in FIG. 2. The spool 50 will be at the bottom of the bore 38 with the ball 60 lifted off the bottom of the longitudinal hole 54 by the pin 62. The valve piston 66 will be positioned in the hole 54 in a position established by the position of the adjustment link 70. The piston 14 of the cylinder 16 will be bottomed out and the seat 10 will be in the lowermost position.

As the pump 48 starts to pump fluid, the fluid will pass into the valve body 28 through the source passage 46. The pressurized fluid will then circulate about the annular groove 52 and a portion of it will enter the longitudinal hole 54 through the passage 58 and be exhausted to the reservoir 42 past the ball 60 while the remainder will pass through the actuator passage 36 into the actuator chamber 26. The pressurized fluid in the actuator chamber 26 will pressurize the accumulator 30 and cause the cylinder 16 to extend to move the seat 10 upwardly.

As the cylinder 16 moves the seat upwardly, the adjustment link 70 and the rod 68 will be likewise moved up causing the valve piston 66 to move and abut the retaining ring 64. As the seat 10 continues to rise, the valve piston 66 will pull the valve spool 50 up until the pin 62 clears the opening 56 and the ball 60 seats to block the opening 56 and thus allow the longitudinal hole 54 to be pressurized.

As the spool 50 moves upwardly in the bore 38, it will reach a position where the land 55 will, due to the inherent overshoot, center over and block the actuator passage 36 from both the source and the reservoir passages 46 and 40 which prevents further extension of the cylinder 16. The seat height at which this occurs, which is referred to as the predetermined ride position, is dependent upon the geometry of the adjustment link 70 and the rod 68.

As is evident, the height of this predetermined ride position may be altered simply by moving the knob 72 to increase or decrease the distance between the pivot 71 and the valve spool 50. Due to the location of the pivot 71, raising the handle 72 will force the spool 50 downward to permit fluid communication between the source passage 46 and the actuator passage 36 to raise the seat 10 and lowering the knob 72 will cause the valve spool 50 to raise and permit fluid communication between the actuator passage 36 and the reservoir passage 40 to lower the seat 10.

When an operator sits down in the seat 10, the seat 10 will first lower from its predetermined ride position in proportion to the operator's weight as the accumulator 30 absorbs the weight loading. As the seat 10 lowers, the valve spool 50 will move downwardly to connect the source passage 46 with the actuator passage 36 to supply additional fluid to cause the cylinder 16 to raise the seat 10 to the position where the valve spool 50 will again block the actuator passage 36. Thus, regardless of operator size, the seat will always return to its predetermined ride position.

Once the vehicle is underway, minor road bumps and shocks are taken up by the accumulator 30 and do not result in the volume of pressurized fluid in the system being changed since the longitudinal length of the land 55 blocks the actuator port 36 from both the source passage 46 and the reservoir passage 40 for minor excursions in a predetermined range from the predetermined ride position. The operator has an additional control in the form of the accumulator dampening adjustment valve 34 which may be turned to adjust the rate at which fluid can flow to the accumulator 30 and thus change the system's equivalent spring stiffness to provide either a softer or stiffer ride.

For large excursions from the predetermined ride position due to major shocks, the accumulator 30 operates in conjunction with the assembly 29. The large excursions in the downward direction cause the spool valve 50 to move downwardly to connect the source passage 46 to the actuator port 36 and thence to the cylinder 16 to add pressurized fluid and substantially increase the system's stiffness. The large excursions in the upward direction cause the spool valve 50 to move upwardly to connect the actuator passage 36 to the reservoir passage 40 to relieve the pressurised fluid in the cylinder 16 and substantially reduce the sytem's stiffness.

Road bumps and shocks between the two extremes are accommodated by a metered addition or reduction of hydraulic fluid to the system around the metering lands 51 and 57, respectively, for predetermined distances above and below the bottom land 55. Thus, three modes of operation are provided to minimize the effects of different magnitudes of shock.

When the pump 48 is shut off, fluid seepage past the land 55 will allow the seat 10 to lower slowly. The position of the adjusting link 70 and the handle 72 will remain constant as the valve spool 50 is moved towards the bottom of the bore 38. As the valve spool 50 aproaches the bottom of the bore 38, the pin 62 will lift the ball 60 to allow pressure to be relieved in the longitudinal hole 54. With pressure relieved in the longitudinal hole 54, the piston 66 will slide downwardly into the valve spool 50 without requiring a change in the position of the adjusting link 70.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. A seat assembly for mounting on a structure having a source of pressurized fluid and fluid reservoir means, comprising: seat means; acutator means interconnecting the seat means and the structure responsive to a fluid connection to the source to move the seat means upwardly away from the structure and a fluid connection to the reservoir means to move the seat means downwardly towards the structure; valving means secured relative to the structure and fluidly interconnecting the actuator means, the source and the reservoir means, said valving means having spool means therein movable from a center position wherein the source and the reservoir means are blocked from the actuator means to an upper position wherein the reservoir means is fluidly connected to the acutator means and to a lower position wherein the source is fluidly connected to the actuator means; and rigid linkage means for maintaining a predetermined distance between the spool means and the seat means whereby the predetermined distance establishes a predetermined ride position of the seat means and movement of the seat means above the predetermined ride position moves the spool means to the upper position and movement of the seat means below the predetermined ride position moves the spool means to the lower position.

2. The seat assembly as clamed in claim 1 wherein said means for maintaining a predetermined distance includes means for increasing the predetermined distance whereby the predetermined ride position is moved upwardly and for decreasing the predetermined distance whereby the predetermined ride position is moved downwardly.

3. The seat assembly as claimed in claim 1 including accumulator means fluidly connected to the actuator means for providing cushioned movement of the seat means above and below the predetermined ride position.

4. The seat assembly as claimed in claim 3 including variable restrictor means interposed in the fluid connection between the accumulator means and the actuator means for dampening the cushioned movement of the seat means.

5. The seat assembly as claimed in claim 1 wherein the spool means includes means for blocking the actuator means from the source and the reservoir means in a predetermined range extending above and below the centered position and including accumulator means fluidly connected to the actuator means for providing cushioned movement of the seat means above and below the predetermined ride position.

6. The seat assembly as claimed in claim 5 wherein the spool means includes metering means for metering fluid from the source to the actuator means and from the actuator means to the source for predetermined distances above and below the predetermined range.

7. A seat assembly for mounting on a structure having a source of pressurized fluid and a fluid reservoir, comprising: seat means; actuator means interconnecting the seat means and the structure responsive to a fluid connection to the source to move the seat means upwardly away from the structure and to a fluid connection to the reservoir means to move the seat means downwardly towards the structure; a valve body having a vertical bore provided therein open to the top, a reservoir passage intersecting the bore at the bottom thereof fluidly connected to the reservoir, a source passage intersecting the bore between the top and bottom thereof fluidly connected to the source and an actuator passage intersecting the bore between the reservoir and source passages fluidly connected to the actuator means; spool means slidably movable in the bore from a neutral position wherein the source and reservoir passages are blocked from the actuator passage to an upper position wherein the reservoir passage is fluidly connected to the actuator passage and to a lower position wherein the source passage is fluidly connected to the actuator passage; and rigid linkage means operatively secured to the spool means and to the seat means for maintaining a predetermined distance between the spool means and the seat means whereby the predetermined distance establishes a predetermined ride position of the seat means and movement of the seat means above the predetermined ride position moves the spool means to the upper position and movement of the seat means below the predetermined ride position moves the spool means to the lower position; said rigid linkage means including adjusting means for increasing the predetermined distance whereby the predetermined ride position is raised and for decreasing the predetermined distance whereby the predetermined ride position is lowered.

8. The seat assembly as claimed in claim 7 wherein the actuator passage is further fluidly connected to accumulator means for providing cushioned movement of the seat means above and below the predetermined ride position.

9. The seat assembly as claimed in claim 8 including restrictor means interposed in the actuator passasge between the bore and the accumulator means for dampening the cushioned movement of the seat means.

10. The seat assembly as claimed in claim 7 wherein the spool means includes land means for blocking the actuator means from the source and the reservoir means in a predetermined range extending above and below the centered position and including accumulator means fluidly connected to the actuator means for providing cushioned movement of the seat means above and below the predetermined ride position.

11. The seat assembly as claimed in claim 10 wherein the spool means includes metering means adjacent the land means for metering pressurized fluid from the source to the actuator means and from the actuator means to the source for predetermined distances above and below the predetermined range.

12. The seat assembly as claimed in claim 7 wherein the spool means includes means for decreasing the predetermined distance without affecting the adjusting means when the source is disconnected from the source passage.

13. A seat assembly for mounting on a structure having a fluid source and a fluid reservoir, comprising: seat means; actuator means interconnecting the seat means and the structure responsive to a fluid connection to the source to move the seat means upwardly away from the structure and to a fluid connection to the reservoir means to move the seat means downwardly towards the structure; a valve body having a vertical bore provided therein open to the top, a reservoir passage provided therein fluidly connected to the reservoir and intersecting the bore at the bottom thereof, a source passage fluidly connected to the source and intersecting the bore between the top and bottom thereof, and an actuator passage fluidly connected to the actuator means and intersecting the bore between the reservoir and the source passages; spool means including top and bottom lands slidable in the bore and separated by an annular groove provided therein, said bottom land slidable from a centered position wherein the actuator passage is blocked from the source and reservoir passages to an upper position wherein the actuator passage is fluidly connected to the reservoir passage and to a lower position wherein the actuator passage is fluidly connected to the source passage; and rigid linkage means operatively secured to the spool means and to the seat means for maintaining a predetermined distance between the spool means and the seat means whereby the predetermined distance establishes a predetermined ride position of the seat means and movement of the seat means above the predetermined ride position moves the bottom land to the upper position and movement of the seat means below the predetermined ride position moves the bottom land to the lower position, said rigid linkage means including adjusting means for increasing the predetermined distance whereby the predetermined distance whereby the predetermined ride position is raised and for decreasing the predetermined distance whereby the predetermined ride position is lowered.

14. The seat assembly as claimed in claim 13 wherein the spool means includes a longitudinal hole provided therein open to the top, stop means in the hole proximate the top, passage means fluidly connecting the hole with the annular groove, and an opening provided in the spool means of larger diameter than the passage means and open to the bottom; said rigid linkage means includes piston means slidable in the hole between the bottom and the stop means, rigid rod means secured to the piston means and protruding through the top of the hole, and link means secured to the rigid rod means opposite the piston means frictionally held and pivotally mounted in the seat means; ball check means in the hole in the spool means normally preventing the flow of fluid through the opening; and means responsive to the spool means approaching the bottom of the bore to move the ball check means to allow the passage of fluid through the opening.

15. The seat assembly as claimed in claim 14 wherein the spool means includes metering land means above and below the bottom land.

16. The seat assembly as claimed in claim 15 including accumulator means for providing cushioned movement of the seat means above and below the predetermined ride position connected to said actuator passage and wherein said actuator passage includes variable restrictor means interposed therein between the bore and the accumulator means for dampening the cushioned movement of the seat means.

* * * * *